United States Patent
Kofoed et al.

(10) Patent No.: US 7,892,467 B2
(45) Date of Patent: Feb. 22, 2011

(54) METHOD AND APPARATUS FOR PROVIDING POLYMER TO BE USED AT VACUUM INFUSION

(75) Inventors: Michael Kofoed, Vejen (DK); Tim Møller Hansen, Vamdrup (DK)

(73) Assignee: LM Glasfiber A/S, Lunderskov (DK)

( * ) Notice: Subject to any disclaimer, the term of this patent is extended or adjusted under 35 U.S.C. 154(b) by 210 days.

(21) Appl. No.: 12/224,555

(22) PCT Filed: Mar. 2, 2007

(86) PCT No.: PCT/DK2007/000107

§ 371 (c)(1),
(2), (4) Date: Oct. 15, 2008

(87) PCT Pub. No.: WO2007/098769

PCT Pub. Date: Sep. 7, 2007

(65) Prior Publication Data

US 2009/0051076 A1 Feb. 26, 2009

(30) Foreign Application Priority Data

Mar. 3, 2006 (DK) ................ 2006 00307

(51) Int. Cl.
*B29C 47/76* (2006.01)
(52) U.S. Cl. .............. 264/101; 264/102; 264/258; 264/314; 264/316; 264/510
(58) Field of Classification Search ........... 264/101, 264/102, 258, 314, 316, 510
See application file for complete search history.

(56) References Cited

U.S. PATENT DOCUMENTS

2003/0011094 A1* 1/2003 Filsinger et al. ............ 264/102

2004/0155385 A1* 8/2004 Johnson et al. ............. 264/511

FOREIGN PATENT DOCUMENTS

| DE | 102 03 975 | 11/2000 |
| DE | 100 13 409 | 6/2003 |
| WO | 2006/058540 | 6/2006 |

* cited by examiner

*Primary Examiner*—Khanh Nguyen
*Assistant Examiner*—Saeed M Huda
(74) *Attorney, Agent, or Firm*—The Nath Law Group; Jerald L. Meyer; Jiaxiao Zhang

(57) ABSTRACT

The invention relates to a method of producing a shell member of fiber composite material by means of vacuum infusion, where the fiber material is impregnated with liquid polymer, and applying a mould (18) with a mould cavity. In the mould cavity a lower distribution layer (11) is placed. A fiber insertion (1) including a plurality of fiber layers is placed above the lower distribution layer (11). A first upper distribution layer (9) and a second upper distribution layer (10) are placed at a transverse distance of each other above the fiber insertion, so that at least a part of the first distribution layer overlaps a first zone (2) of the fiber insertion (1), and at least a part of the second distribution layer overlaps a second zone (3) of the fiber insertion (1), the first zone (2) and the second zone (3) being separated by an intermediate zone (6) neither overlapping the first nor the second distribution layer (9, 10). A first inlet channel (7) is placed above the first distribution layer (9), and a second inlet channel (8) is placed on top of the second distribution layer (10). Above the intermediate zone (6) of the fiber insertion (1) a semi-permeable membrane (5) is placed, which may expand overlappingly over the first distribution layer (9) and/or the second distribution layer (10), and which is permeable to gasses and substantially impermeable to liquid polymer, said semi-permeable membrane (5) communicating with a vacuum source. Finally, in a manner known per se, a vacuum bag (19) is placed on top of the mould (18), which is evacuated of air by means of the vacuum source, and polymer is directed into the mould via the first and the second inlet channels (7, 8). The invention also relates to an apparatus for providing polymer for use with the method.

7 Claims, 4 Drawing Sheets

METHOD AND APPARATUS FOR PROVIDING POLYMER TO BE USED AT VACUUM INFUSION

TECHNICAL FIELD

The present invention relates to a method of producing a shell member of fibre composite material by means of vacuum infusion, where the fibre material is impregnated with liquid polymer, and where a mould with a mould cavity is applied. Furthermore the invention relates to an apparatus for providing polymer to be used at vacuum infusion in connection with manufacturing preferably oblong shell members.

Thus the invention relates to a method and an apparatus for producing fibre composite mouldings by means of VARTM (vacuum assisted resin transfer moulding), where liquid polymer, also called resin, is filled into a mould cavity, in which fibre material priorly has been inserted, as a vacuum is generated in the mould cavity hereby drawing in the polymer. The polymer can be thermoset plastic or thremoplast.

PRIOR ART

Vacuum infusion is a process used for moulding fibre composite mouldings, where uniformly distributed fibres, said fibres being rovings, i.e. bundles of fibre bands, bands of rovings or mats, which are either felt mats made of individual fibres or woven mats made of fibre rovings, are layered in one of the mould parts. The second mould part is often made of a resilient vacuum bag, and is subsequently placed on top of the fibre material. By generating a vacuum, typically 80 to 90% of the total vacuum, in the mould cavity between the inner side of the mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases the polymer applied is polyester or epoxy, and the fibre reinforcement is most often based on glass fibres or carbon fibres.

During the process of filling the mould, a vacuum, said vacuum in this connection being understood as a negative pressure, is generated via the vacuum channels in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to remove by controlling the vacuum pressure and possibly an overpressure at the inlet side. In connection with vacuum infusion, employing a solid mould part and a resilient mould part in the form of a vacuum bag, the dry spots can be repaired after the process of filling the mould by for example puncturing the cloth in the respective location and by drawing out air for example by means of a syringe needle. Liquid polymer can optionally be injected in the respective location, and this can for example be done by means of a syringe needle as well.

This is a time-consuming and tiresome process. In the case of large mould parts, staff have to stand on the vacuum bag, which is not desirable, especially not when the polymer has not hardened, as it can result in deformations in the inserted fibre material and thus in a local weakening of the structure.

Patent literature discloses examples of the use of a semi-permeable membrane, which increases the area, in which the vacuum is active, and thus reduces the above problems. In this connection the term semi-permeable membrane means a membrane, which is permeable to gasses but impermeable to liquid polymer. Thus if a semi-permeable membrane is placed across the fibre insertion, air pockets can be removed more easily.

As for instance blades for wind turbines have become bigger and bigger in the course of time, and may now be more than 60 meters long, the impregnation time in connection with manufacturing such blades has increased, as more fibre material has to be impregnated with polymer. Furthermore the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result the polymer has to stay liquid for a longer time, normally also resulting in an increase in the curing time.

DISCLOSURE OF INVENTION

The object of the present invention is to provide a new and improved method of manufacturing a shell member of fibre composite material by means of vacuum infusion, where both the time for filling the mould, the curing time and the risk of dry spots can be reduced.

The object of the invention is achieved in that, in the mould cavity:

a) a lower distribution layer is placed, b) a fibre insertion including a plurality of fibre layers is placed above the lower distribution layer, c) a first upper distribution layer and a second upper distribution layer are placed at a transverse distance of each other above the fibre insertion, so that at least a part of the first distribution layer overlaps a first zone of the fibre insertion, and at least a part of the second distribution layer overlaps a second zone of the fibre insertion, the first zone and the second zone being separated by an intermediate zone neither overlapping the first nor the second distribution layer, d) a first inlet channel is placed above the first distribution layer, e) a second inlet channel is placed on top of the second distribution layer, f) above the intermediate zone of the fibre insertion a semi-permeable membrane is placed, which may expand overlappingly over the first distribution layer and/or the second distribution layer, and which is permeable to gasses and substantially impermeable to liquid polymer, said semi-permeable membrane communicating with a vacuum source, whereafter g) in a manner known per se, a vacuum bag is placed on top of the mould, which is evacuated of air by means of the vacuum source, and polymer is directed into the mould via the first and the second inlet channels.

The term "distribution layer" is to be understood as a layer, which allows a higher flow speed for liquid polymer than the fibre insertion does. Hereby, first the liquid polymer quickly spreads within the two upper distribution layers, whereafter a flow front of polymer moves through the first and the second zone. When the flow front reaches the bottom side of the fibre insertion, the polymer subsequently quickly spreads within the lower distribution layer, whereby liquid polymer is drawn in below the intermediate zone. The flow front subsequently moves upwards through the intermediate zone and up towards the semi-permeable membrane, which is connected to a vacuum source. At the end of the impregnation phase or the injection phase the flow front forms a predominantly v-shaped flow front, whereby it is ensured that air pockets do not arise in the fibre insertion. As the width of the fibre insertion is often somewhat bigger than the thickness of the fibre insertion, this method ensures that the impregnation time is minimised, as a relatively wide flow front first moves down through the first zone and the second zone and then moves upwards through the intermediate zone. Hereby the total length to be passed by the flow front of polymer is minimised compared to e.g. impregnation processes, where the flow front predominantly moves transversely in the plane of the fibre insertion. As the impregnation time is reduced, the subsequent curing time can also be reduced, and thus the total time for manufacturing e.g. blades for wind turbines. The method is particularly suitable for manufacturing oblong shell members.

Furthermore this method has the advantage that all inlets can be opened at the same time. This means that the method does not require any individual assessment of how far the flow front has moved, and when the next inlet is to be opened, while it still provides a good and homogeneous quality of the impregnation.

The distribution layer may for instance be made from porous core material, e.g. balsa, provided with channels, which are formed like recesses in the surface, and which extend along the plane of the distribution layer, often perpendicular to the longitudinal direction of the blade. The channels may, however, also expand in other angles compared to the longitudinal direction of the blade. Alternatively, the distribution layer may be made of a net or a fibre mat with a high permeability.

According to an advantageous embodiment of the method according to the invention, a plurality of fibre layers is placed in the mould cavity prior to step a), and preferably also a gel coat defining the exterior of the finished moulded shell member.

According to another advantageous embodiment, a plurality of fibre layers is placed in the mould cavity between steps b) and c), said plurality of fibre layers defining the interior of the finished moulded shell member. The fibre layers of the finished moulded shell member are preferably relatively thin.

According to a preferred embodiment, a tear-off layer, preferably in the form of a perforated film, is placed on top of the upper fibre layer or on top of the fibre insertion. Hereby the upper distribution layers, the semi-permeable membrane and the inlet channels can be removed easily after curing has finished by tearing off the tear-off layer, on top of which all these elements are placed.

According to an advantageous embodiment of the invention, the fibre insertion constitutes a main laminate, which is a longitudinal reinforcement section in a blade shell half for a blade of a wind turbine. Such a main laminate makes the blade of the wind turbine rigid and absorbs great stress loads during the operation of the wind turbine. According to another advantageous embodiment the fibre insertion is a root laminate, which is a reinforcement section in the root area of a blade shell half for the blade of a wind turbine. This root laminate will preferably extend predominantly in the transverse direction of the entire root area. Furthermore, the fibre insertion can also be front or back reinforcements of a blade shell half for a blade of a wind turbine. The method according to the invention makes it possible to start all inlets at the same time and thus impregnate all laminates at the same time, with known systems this would require a temporal control of the inlet channels and/or vacuum channels in order to ensure that dry spots are avoided. Thus a substantial reduction of the total impregnation time can be achieved.

According to an embodiment the fibre insertion is 10-100 mm, 20-80 or 30-50 mm thick. According to an advantageous embodiment the intermediate zone is 50-1000 mm, 70-500 mm or 100-200 mm wide.

Vacuum channels may be provided along the rims of the mould. Hereby e.g. the parts of the blade shell half at each side of the main laminate are injected efficiently with polymer.

The object according to the invention is also achieved by an apparatus for providing polymer to be used at vacuum infusion in connection with manufacturing preferably oblong shell members, the apparatus includes a first distribution layer and a second distribution layer extending parallel in a longitudinal direction at a transverse distance to each other, thus providing an intermediate, longitudinal zone between the first distribution layer and the second distribution layer, and a semi-permeable membrane covering at least substantially the entire intermediate zone, and which is adapted to communicate with a vacuum source. Hereby this apparatus can be laid out in its entirety in an arbitrary form in connection with a vacuum infusion process. Hereby the time for the preparation of the mould filling process can be reduced, as the semi-permeable membrane and distribution layer can be placed correctly in relation to each other in a single working process.

According to a preferred embodiment the apparatus according to the invention furthermore includes: a first inlet channel adapted to be able to be connected to a polymer source, and which has one or more openings facing towards the first distribution layer, and a second inlet channel adapted to be able to be connected to a polymer source, and which has one or more openings facing towards the second distribution layer.

According to an advantageous embodiment the semi-permeable membrane is placed between the first distribution layer and the second distribution layer. Thus the two distribution layers and the semi-permeable membrane can be formed as e.g. a joint bag.

According to an alternative advantageous embodiment, the semi-permeable membrane is placed so that it overlaps the first distribution layer and/or the second distribution layer.

According to a preferred embodiment the inlet channels are formed as tubes with an omega profile. The inlet channels can also be formed as tubes with perforations.

According to an advantageous embodiment of the apparatus for providing polymer, the semi-permeable membrane forms part of a longitudinal vacuum channel.

According to another embodiment, the apparatus includes a preferably oblong membrane bag with a front, a back, a central vacuum channel and two inlet channels extending at each side of the vacuum channel, the front in the area of the vacuum channel being constituted by the semi-permeable membrane and in the area of the inlet channels being permeable to liquid polymer. Hereby a particularly simple embodiment is provided.

According to a preferred embodiment of the apparatus for providing polymer, said apparatus furthermore includes a tear-off layer, preferably in the form of a perforated film, placed externally compared to the two distribution layers. Hereby the distribution layers and the vacuum bag as well as possibly the inlet channels and/or vacuum channels can be placed on the tear-off layer, whereby all of these components can be removed jointly after finished manufacturing of e.g. a blade for a wind turbine.

According to an embodiment the apparatus for providing polymer furthermore includes a third distribution layer, which is placed at a transverse distance from the second distribution layer, and a further semi-permeable membrane, which is placed between or partially overlapping the second and third distribution layer. Thus the apparatus for providing polymer can according to the same principle include further distribution layers and semi-permeable membranes.

BRIEF DESCRIPTION OF THE DRAWINGS

The invention is explained in detail below with reference to an embodiment shown in the drawings, in which.

BEST MODE FOR CARRYING OUT THE INVENTION

Figure 1:
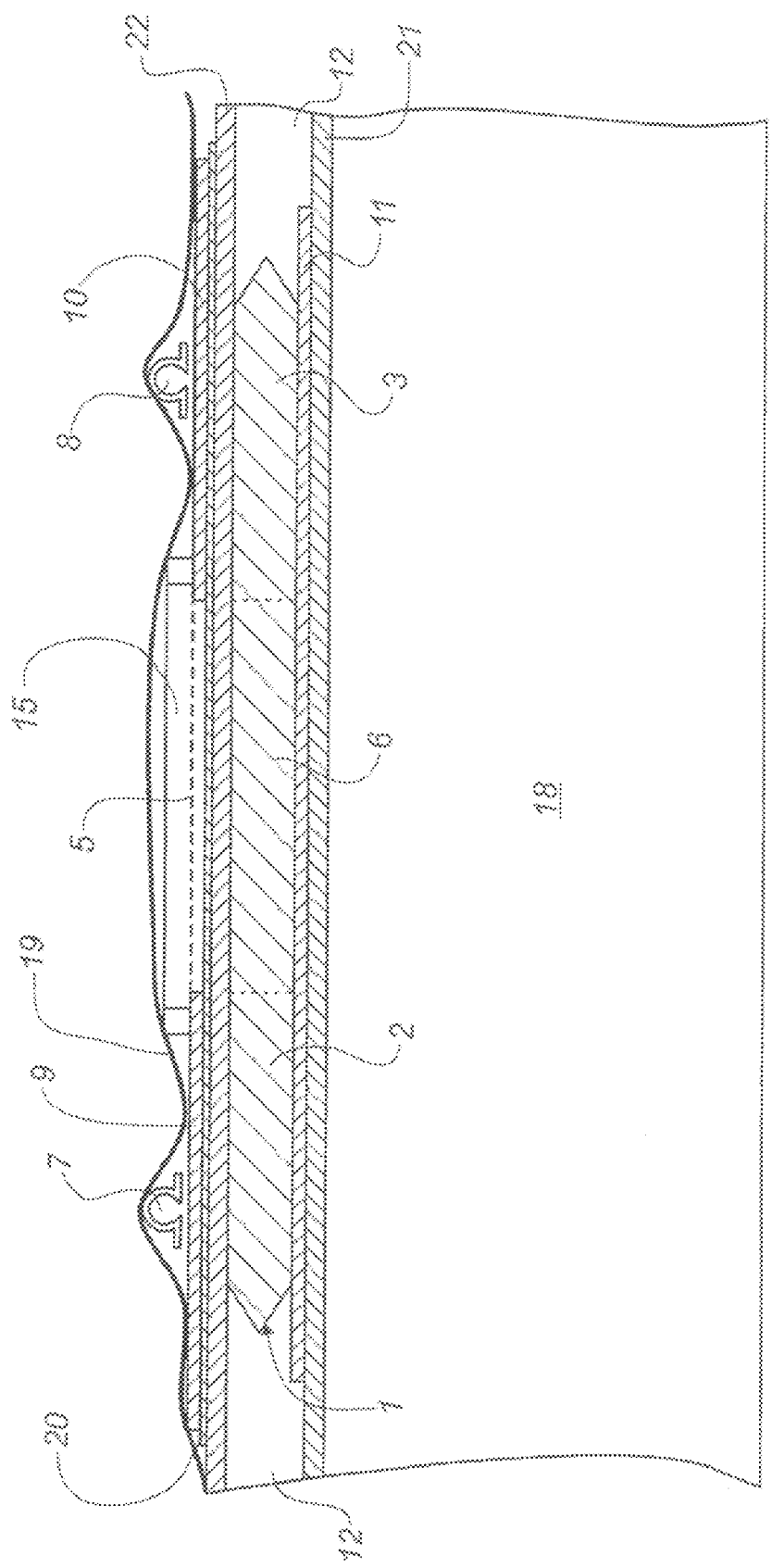
FIG. 1 is a diagrammatic cross section through an arrangement for carrying out the method according to the invention.

The section shown in FIG. 1 through a mould for manufacturing a blade shell half for a blade of a wind turbine by means of vacuum infusion shows a solid mould part 18 with a top side matching the exterior side of the finished blade shell half. For illustrative reasons the top side of said mould part 18 is shown as being plane, but it will typically be curved to the desired form of the blade shell half. First, a so-called gel coat is placed on the inner side of the mould part 18, said gel coat later on forming the outside of the finished blade shell half. Above the gel coat is placed a fibre material consisting of a plurality of lower, preferably thin, fibre layers 21, above which a lower distribution layer 11 is placed. A fibre insertion 1 is placed on top of the distribution layer 11 and the fibre layers 21, and next to said fibre insertion a filling material or sandwich material, such as balsa 12 or PVC foam, is placed.

Above the fibre insertion 1, in the shown embodiment constituting the main laminate of the blade, a fibre material in form of a plurality of upper, preferably thin, fibre layers 22 is placed. An apparatus for providing polymer, which is laid into the mould part 18, so that it extends in the longitudinal direction of the mould part, is placed on top of the upper fibre layers 22. The apparatus for providing polymer includes a tear-off layer 20, a first upper distribution layer 9, a second distribution layer 10 and a vacuum channel 15 with a semi-permeable membrane 5. The first 9 and the second 10 distribution layer are placed so that they extend predominantly parallel in the longitudinal direction at a transverse distance to each other. The first upper distribution layer 9 is placed so that it overlaps a first zone 2 of the main laminate 1, and the second distribution layer is placed so that it overlaps a second zone 3 of the main laminate, thus creating an intermediate zone 6 between the first and the second zone 2, 3.

Here the vacuum channel 15 is shown in an embodiment, where the semi-permeable membrane 5 partly overlaps the two upper distribution layers 9, 10, but the vacuum channel 15 can also be placed between the two upper distribution layers 9, 10. The apparatus for providing polymer can furthermore include a first inlet channel 7 with one or more openings, which are permeable to liquid polymer, and which face the first upper distribution layer 9, and a second inlet channel 8 with one or more openings, which are permeable to liquid polymer, and which face the first upper distribution layer 10. Alternatively the two inlet channels 7, 8 can subsequently be placed as separate units on top of the first and the second distribution layer 9, 10, respectively.

The different distribution layers 9, 10, 11 can e.g. be made from porous core material, e.g. balsa, provided with channels formed as recesses in the surface and extending in the plane of the distribution layer, often perpendicular to the longitudinal direction of the blade. The channels can, however, also extend at any other possible angle compared to the longitudinal direction of the blade. Alternatively the distribution layer is a net or a fibre mat with high permeability.

At the top an airtight vacuum bag 19 is placed, together with the solid mould part 18 forming a mould cavity. Furthermore, vacuum channels, e.g. in the form of perforated vacuum tubes, can be placed at the flanges of the mould.

During the process of filling the mould the vacuum channel 15 and possibly other applied vacuum channels communicate with a vacuum source, and the inlet channels 7, 8 communicate with a polymer source with liquid polymer. The vacuum in the vacuum channels creates a vacuum in the entire mould cavity between the solid mould part 18 and the vacuum bag 19, hereby drawing polymers through the inlet channels 7, 8 into the mould cavity as the polymer spreads through and impregnates the fibre materials 1, 21, 22. When curing is completed, the vacuum bag 19 and the tear-off layer 20 are removed together with the upper distribution layer 9, 10 and the vacuum channel 15.

It is not shown in FIG. 1, but the leading edge and the trailing edge of the blade shell part typically have rim reinforcements of fibre material. As seen in FIG. 1, a part of the mould cavity in the area between the main laminate 1 and the rim reinforcements is filled with filling material, such as plate-formed balsa 12. This plate-formed balsa material is porous and thus permeable to liquid polymer. The balsa 12 is typically provided with channels extending in the plane of the distribution layer perpendicular to and in the longitudinal direction of the blade shell half. The channels can e.g. be formed by placing balsa blocks on a permeable cloth or net. These channels ensure that liquid polymer can spread quickly in the plane of the distribution layer. The filling material need not, however, be balsa, but can be of any other material with good flow qualities. This could be PVC foam or a loosely woven mat of glass fibre or a similar net structure with high permeability and large capacity.

During the process of filling the mould, liquid polymer flows from the inlet channels 7, 8 into the mould cavity due to the vacuum in the mould cavity. Due to the vacuum in the entire mould cavity, the liquid polymer is both drawn towards the leading edge and trailing edge of the blade shell part and into the fibre insertion 1 of the main laminate.

FIGS. 2a-h show how the fibre material 3 of the main laminate is impregnated with liquid polymer during the process of filling the mould. For the sake of simplicity, the dispersion of the polymer in the filling material 12 is not shown. Prior to the start of the process of filling the mould, air is evacuated in the mould cavity by means of the vacuum channels 15 and possibly other vacuum channels, which e.g. can be placed at the front or back of the blade shell half. The evacuation of the air creates a vacuum which is to be understood as a negative pressure in the mould cavity.

Figure 2A:
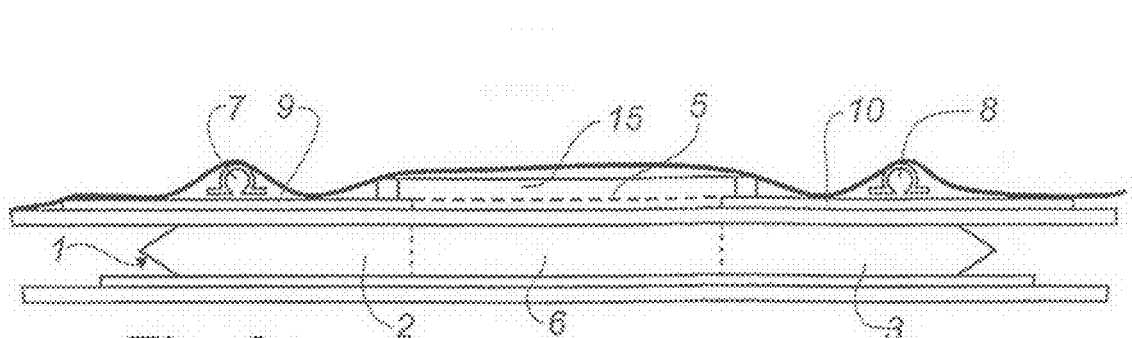
FIGS. 2a-h are diagrammatic cross sections showing how liquid polymer spreads in the fibre insertion by the method according to the invention.
Figure 2B:
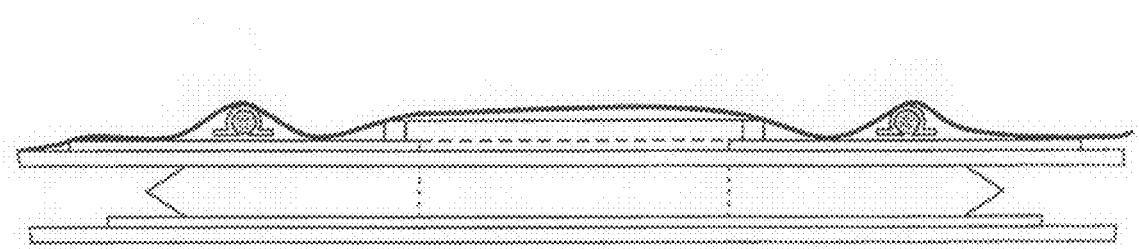
Figure 2C:
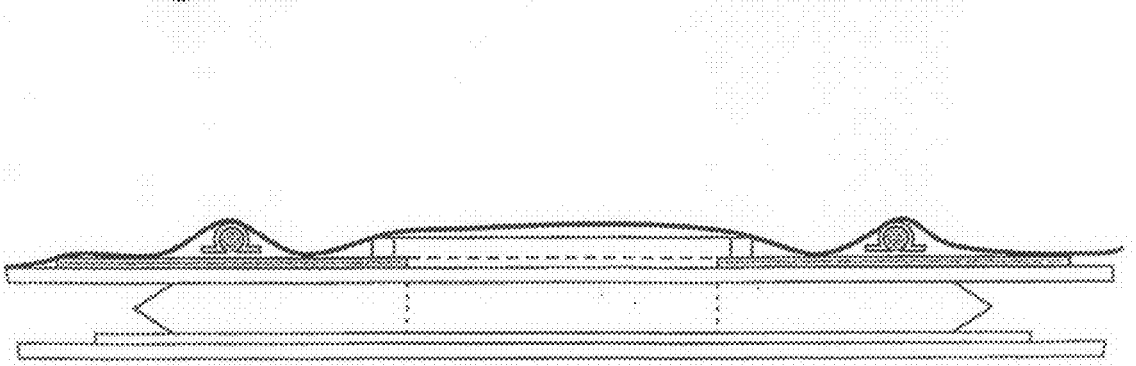
Figure 2D:
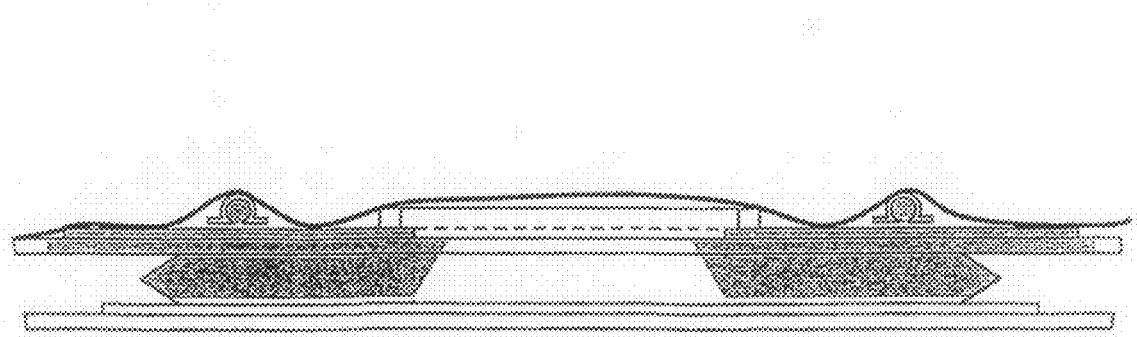

FIG. 2b diagrammatically shows the start of the process of filling the mould, where the inlet channels 7, 8 are filled with liquid polymer, indicated by the dark colour. At the start of the process of filling the mould, liquid polymer is directed to the two upper distribution layers 9, 10, which are quickly filled with polymer due to the high permeability for the distribution layers, shown in FIG. 2c. Hereafter the polymer slowly spreads down through the main laminate 1 as shown in FIG. 2d, as the liquid polymer creates two wide flow fronts moving down through the first zone 2 and the second zone 3, respectively. At the same time, some of the polymer is drawn into the intermediate zone 6 towards the semi-permeable membrane 5.

Figure 2E:
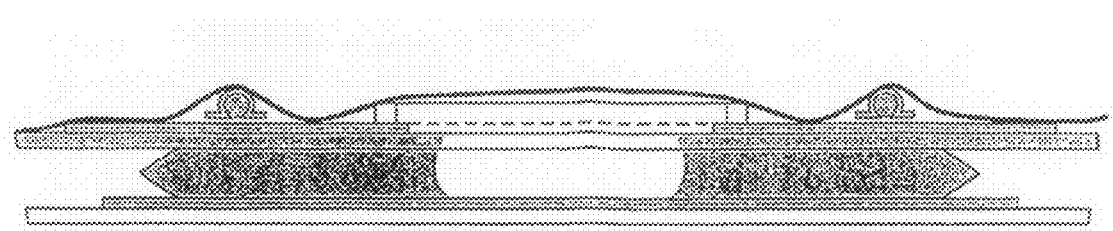
Figure 2F:
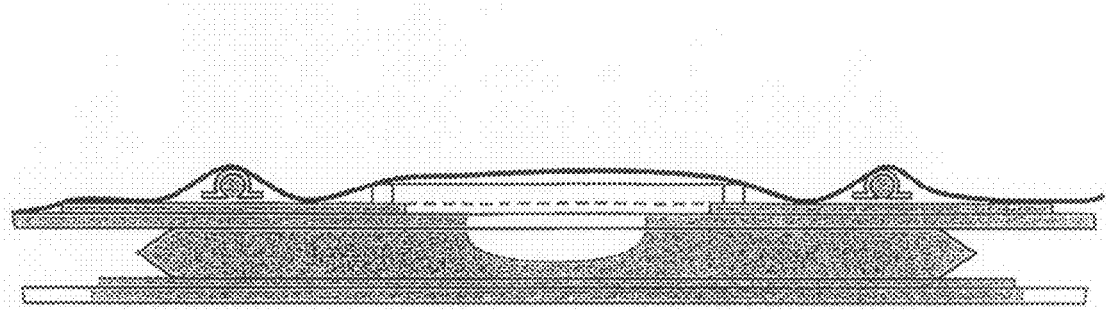
Figure 2G:
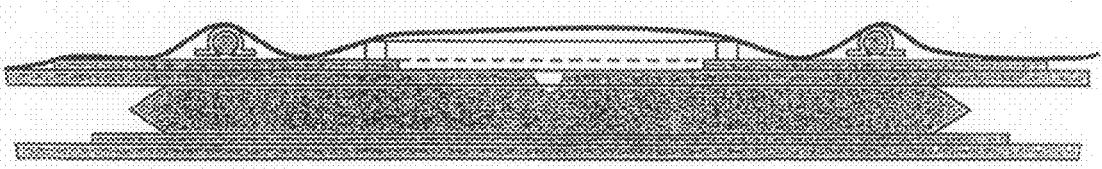
Figure 2H:
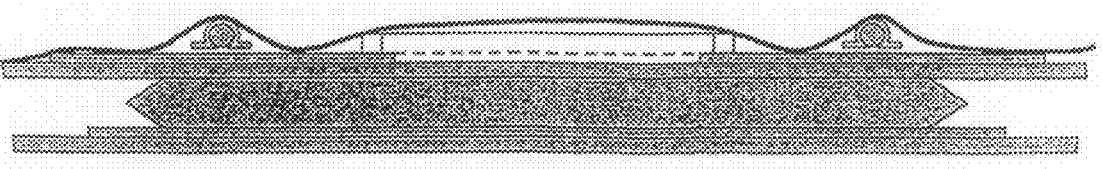

When the flow front reaches the lower distribution layer 11 as shown in FIG. 2e, the polymer quickly spreads herein and thus in below the intermediate zone 6 due to the high permeability of the material. Subsequently, as shown in FIG. 2f, the flow front moves upwards through the intermediate zone 6 and finally, as shown in FIG. 2g, form a desired v-shape ensuring that no air pockets arise. At the end, the entire main laminate 1 is impregnated as shown in FIG. 2h, whereafter the curing process is started.

The upper distribution layers 9, 10 and the lower distribution layer 11 ensure that liquid polymer spreads in the main laminate 1 with relatively wide flow fronts on the way down through the first and the second zone 2, 3 as well as on the way up through the intermediate zone 6. As the width of the main laminate is often many times the size of the thickness of the main laminate, it is ensured that the flow front of polymer is to move the shortest distance possible, whereby the impregnation time can be reduced and thus also the subsequent curing time. Thereby the total time for manufacturing e.g. a blade for a wind turbine can be reduced substantially. Tests with the shown impregnation process have shown that the impregnation time can be reduced by between a third and half of the impregnation time by using techniques known per se.

To ensure that the flow front of polymer only moves slowly transversely in the main laminate 1 towards the intermediate zone 6, the material of the main laminate 1 can be built up in such a way that it has a higher permeability across the fibre layers than in the plane of the fibre layers.

In FIGS. 1 and 2 the lower distribution layer 11 is shown as being wider than the main laminate 3. This, however, is not necessary. The distribution layer, however, has to be at least as wide as the intermediate zone 6, so that the distribution layer 11 can "get hold of" the flow fronts, which move downwards through the first zone 2 and the second zone 3.

To ensure that air pockets do not arise during the process of impregnation it is furthermore important that the thickness of the main laminate 1 and the width of the intermediate zone 6 are mutually dimensioned appropriately. The width of the intermediate zone 6 can be bigger, e.g. 2-3 times bigger and typically approx. five times as big as the thickness of the main laminate 1.

The inlet channels 7, 8 can be dimensioned so that a large amount of liquid polymer can flow through them. At the end of the process of filling the mould the polymer source can be closed prior to closing the vacuum source, whereby the inlet channels 7, 8 can be emptied of liquid polymer more easily. This reduces the polymer wastage.

The vacuum channel 15 can be formed by the semi-permeable membrane 5 and a cloth, wherein distance material can be placed in the form of a three-dimensional net or the like in order to ensure that the membrane 5 and the cloth do not collapse during the process of filling the mould, during which a vacuum is established in the vacuum channel 15.

For the inlet channels 7, 8, Ω-shaped profile members or perforated tubes known per se can be used. The vacuum channels can also be formed as Ω-shaped profile members or perforated tubes. If perforated vacuum tubes are applied, they may be reinforced by a helical rigid member extending into the tube and preventing it from collapsing due to the vacuum.

Figure 3:
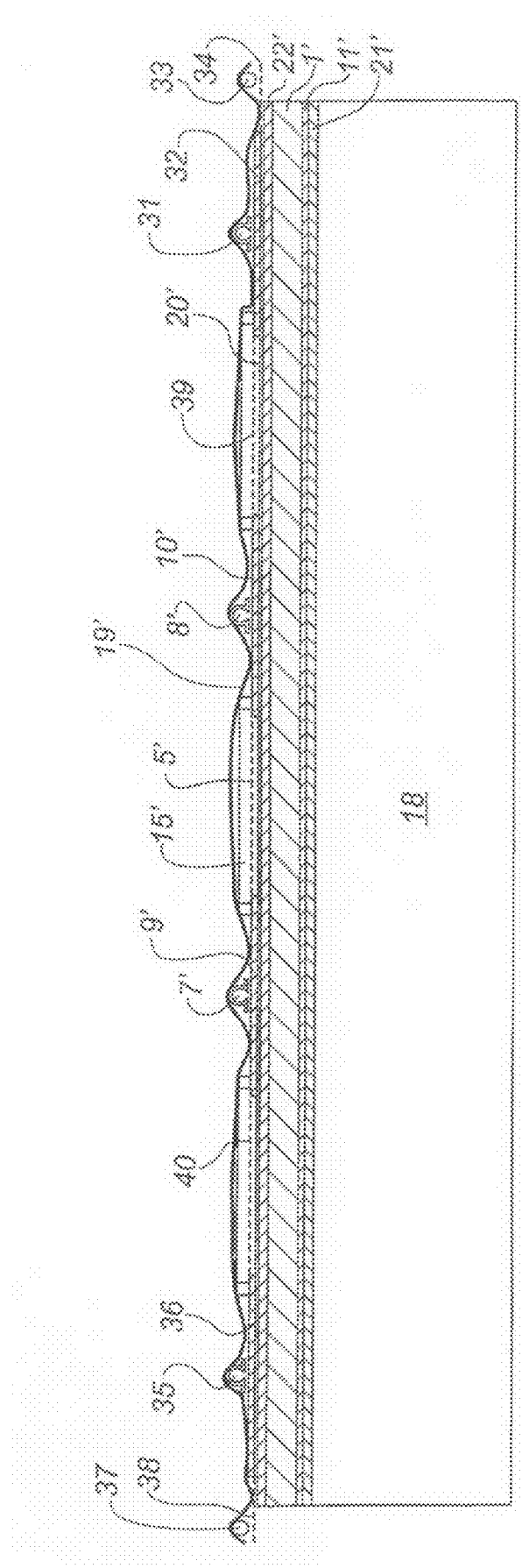
FIG. 3 shows a diagrammatic cross section through another arrangement for carrying out the method according to the invention.

FIG. 3 shows a section through a mould for manufacturing a blade shell half for of blade of a wind turbine, where the section shows the root area of the blade. For illustrative reasons the mould 18 is shown "unfolded", so that the surface 18 of the mould is shown as being plane. In reality, it is, of course, curved, as the root profile of a blade is typically substantially circular. First a gel coat is provided at the inside of the mould part 18, said gel coat constituting the outside of the finished blade shell half. Above the gel coat a fibre material is placed, which consists of a plurality of lower fibre layers 21', above which a lower distribution layer 11' is placed. A fibre insertion 1' is placed above the distribution layer 11'. On top of the fibre insertion 1', in the shown embodiment constituting the root laminate of the blade, a fibre material in the form of a plurality of upper fibre layers 22' is placed. Above the upper fibre layers 22', an apparatus for providing polymer is placed, said apparatus being laid into the mould part 18, so that it extends in the longitudinal direction of the mould part. The apparatus for providing polymer includes a tear-off layer 20', a first upper distribution layer 9', a second distribution layer 10' and a first vacuum channel 15' with a first semi-permeable membrane 5. The first 9' and the second 10' distribution layer are placed so that they extend substantially parallel in the longitudinal direction at a transverse distance to each other. The apparatus for providing polymer can furthermore include a first inlet channel 7' with one or more openings which are permeable to liquid polymer, and which face the first upper distribution layer 9', and a second inlet channel 8' with one or more openings, which are permeable to liquid polymer, and which face the first upper distribution layer 10'. Alternatively the two inlet channels 7', 8' can subsequently be laid as separate units on top of the first and the second distribution layer 9', 10', respectively.

According to the embodiment shown in FIG. 3, the apparatus for providing polymer furthermore includes a third distribution layer 32 with a third inlet channel 31 placed above hereof. The third distribution layer 32 is placed at a transverse distance from the second distribution layer 10'. A second semi-permeable membrane 39, forming part of the vacuum channel, is placed between or partly overlapping the second distribution layer 10' and the third distribution layer 32. The apparatus for providing polymer furthermore includes a fourth distribution layer 36 with a fourth inlet channel 35 placed above hereof. The fourth distribution layer 36 is placed at a transverse distance from the first distribution layer 9'. A third semi-permeable membrane 40, forming part of a vacuum channel, is placed between or partly overlapping the first distribution layer 9' and the fourth distribution layer 36.

At the top an airtight vacuum cloth 19' is provided, said vacuum cloth forming a mould cavity together with the solid mould part 18. Furthermore, at the flanges of the mould, a first and a second outer vacuum channel 33, 37, e.g. in the form of perforated vacuum tubes with corresponding semi-permeable membranes 34, 38 are placed.

During the process of filling the mould, the vacuum channels communicate with a vacuum source, and the inlet channels 7', 8', 31, 35 communicate with a polymer source with liquid polymer. The vacuum in the inlet channels provides a vacuum in the entire mould cavity between the solid mould part 18 and the vacuum bag 19', and hereby polymer is drawn through the inlet channels 7', 8', 31, 35 and into the mould cavity, as it spreads in the fibre materials 1', 21, 22 and impregnates them. After finished curing, the vacuum bag 19' and the tear-off layer 20' are removed together with the upper distribution layers 9', 10', 32, 36 and the vacuum channels.

During the process of filling the mould, liquid polymer flows from the inlet channels 7', 8', 31, 35 and into the mould cavity due to the vacuum. At the start of the process the liquid polymer quickly spreads in the four upper distribution layers 9', 10', 32, 36 and subsequently spreads downwards through the zones in the root laminate 1' below the upper distribution layers 9', 10', 32, 36. When the flow front of polymer reaches the lower distribution layer 11', the polymer quickly spreads herein towards the sides and in below the zones placed below the three semi-permeable membranes 5', 39, 40. Hereafter the flow fronts move upwards towards the semi-permeable membranes 5', 39, 40.

This method for vacuum infusion has the advantage that all inlets can be started at the same time, and thus do not require a temporal control of the various inlets and vacuum channels to direct the flow fronts. Hereby the total impregnation time or injection time can be reduced substantially. A further advantage of the method is that the wastage of polymer can be reduced substantially compared to prior art. Wastage of polymer can be avoided entirely if a semi-permeable membrane is applied in all rim suctions of the mould.

The invention has here been described based on an arrangement with a line suction. It is, however, possible to use a point suction instead of, where the vacuum channel is placed above the intermediate zone, and where the upper distribution layers extend in a circumferential direction around the point suction of the vacuum channel.

From this description a person skilled in the art will know that the combination of the two upper distribution layers, which are divided by the intermediate zone without distribution layer and the lower distribution layer at least overlapping the intermediate zone, is the essence of the invention. The width of the intermediate zone can be determined based on tests with a certain material. Thus on manufacturing a blade a plurality of apparatuses for providing polymer can also be used, where the upper distribution layers of the various apparatuses are not necessarily placed at the same transverse distance.

LIST OF REFERENCE NUMERALS

1 fibre insertion/laminate
2 first zone
3 second zone
5 semi-permeable membrane
6 intermediate zone
7 first inlet channel
8 second inlet channel
9 first upper distribution layer
10 second upper distribution layer
11 lower distribution layer
12 filling material/balsa
15 vacuum channel
19 vacuum bag
20 tear-off layer
21 lower fibre layer
22 upper fibre layer
31 third inlet channel
32 third distribution layer
33 first outer vacuum channel
34 semi-permeable membrane
35 fourth inlet channel
36 fourth distribution channel
37 second outer vacuum channel
38 semi-permeable membrane
39 second semi-permeable membrane
40 third semi-permeable membrane

The invention claimed is:

1. Method of producing a shell member of fibre composite material by means of vacuum infusion, where the fibre material is impregnated with liquid polymer, and applying a mould (18) with a mould cavity, characterized in that, in the mould cavity:
   a) a lower distribution layer (11) is placed,
   b) a fibre insertion (1) including a plurality of fibre layers is placed above the lower distribution layer (11),
   c) a first upper distribution layer (9) and a second upper distribution layer (10) are placed at a transverse distance of each other above the fibre insertion, so that at least a part of the first distribution layer overlaps a first zone (2) of the fibre insertion (1), and at least a part of the second distribution layer overlaps a second zone (3) of the fibre insertion (1), the first zone (2) and the second zone (3) being separated by an intermediate zone (6) neither overlapping the first nor the second distribution layer (9, 10),
   d) a first inlet channel (7) is placed above the first distribution layer (9),
   e) a second inlet channel (8) is placed on top of the second distribution layer (10),
   f) above the intermediate zone (6) of the fibre insertion (1) a semi-permeable membrane (5) is placed, which may expand overlappingly over the first distribution layer (9) and/or the second distribution layer (10), and which is permeable to gasses and substantially impermeable to liquid polymer, said semi-permeable membrane (5) communicating with a vacuum source, whereafter
   g) a vacuum bag (19) is placed on top of the mould (18), which is evacuated of air by means of the vacuum source, and polymer is directed into the mould via the first and the second inlet channels (7, 8).

2. Method according to claim 1, wherein prior to step a) a plurality of fibre layers (21) is placed in the mould cavity, and preferably also a gel coat defining the exterior of the finished moulded shell member.

3. Method according to claim 1, wherein a plurality of fibre layers (22) is placed in the mould cavity between steps b) and c), said plurality of fibre layers defining the interior of the finished moulded shell member.

4. Method according to claim 1, wherein the fibre insertion (1) constitutes a main laminate, which is a longitudinal reinforcement section in a blade shell half for a blade of a wind turbine.

5. Method according to claim 1, wherein the fibre insertion (1) is 10-100 mm, 20-80 or 30-50 mm thick.

6. Method according to claim 1, wherein the intermediate zone (6) is 50-1000 mm, 70-500 mm or 100-200 mm wide.

7. Method according to claim 1, wherein vacuum channels (16) are provided along the rim of the mould.

* * * * *